Sept. 29, 1925.　　　　　　　　　　1,555,283
C. B. HILLHOUSE
PROCESS OF MAKING CEMENT CLINKER
Filed Dec. 5, 1921
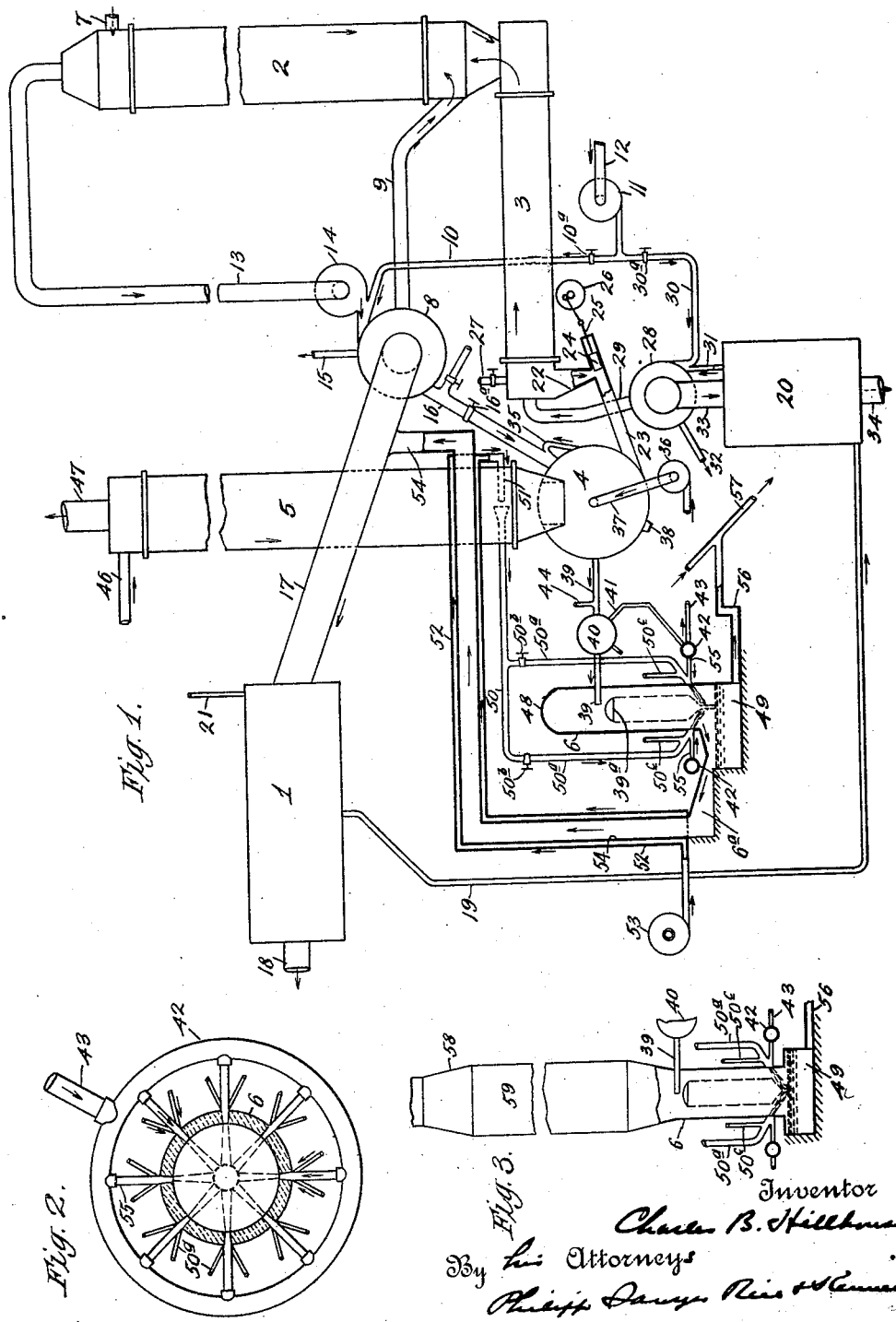
Inventor
Charles B. Hillhouse
By his Attorneys Patented Sept. 29, 1925.

1,555,283

UNITED STATES PATENT OFFICE.

CHARLES B. HILLHOUSE, OF NEW YORK, N. Y.

PROCESS OF MAKING CEMENT CLINKER.

Application filed December 5, 1921. Serial No. 519,856.

*To all whom it may concern:*

Be it known that I, CHARLES B. HILL-HOUSE, a citizen of the United States, residing at New York, county of New York, and State of New York, have invented certain new and useful Improvements in Processes of Making Cement Clinker, fully described and represented in the following specification and the accompanying drawings, forming a part of the same.

This invention relates to a process of making cement clinker and iron or steel in a continuous operation.

Briefly stated the process, as a whole, includes the following principal steps, first, reducing iron ore to sponge and purifying the latter, second, adding to the sponge lime in sufficient quantity to create (on fusion) a lime-silica-aluminous slag of established commercial type and low fusing point, third, fusing the sponge and lime thus combined, fourth, drawing off separately the molten iron or steel and slag, and, fifth, raising the slag thus withdrawn to a clinkering temperature and adding lime to it at a clinkering temperature and in sufficient quantity to produce cementitious slag.

The result is two products, namely, cement slag, ready to be shotted and used as cement, and a by-product of iron or steel which may, during its production or later, have ingredients added to it to attain any desired quality as to carbon content or otherwise.

The process thus briefly outlined is, as before indicated, a continuous one and also one in which the two products are simultaneously produced. To provide for this the process is carried out in a plant or apparatus, hereinafter fully described, in which ore is continuously supplied to a kiln, in which it is reduced; the resulting sponge is passed through a conveyor in which it is purified; lime is then supplied from a suitable kiln to the purified sponge in sufficient quantity to form a lime-silica-aluminous slag of established commercial type and of low fusing point; the combined sponge and lime are then fused in a suitable chamber at a temperature substantially lower than a clinkering temperature; the resulting iron and slag are then separately withdrawn from this chamber; the slag conveyed to a clinkering chamber into which it is introduced at a clinkering temperature, and more lime from the lime kiln above referred to and at a clinkering temperature, is added to and combined with the slag in said clinkering chamber.

Referring to the accompanying drawing—

Fig. 1 is a diagrammatic view of a plant or apparatus for practicing the process.

Fig. 2 is a horizontal section of the clinkering chamber, on an enlarged scale, and Fig. 3 is a vertical elevation of a modified form of clinkering chamber, also on an enlarged scale.

In said drawings, 1 represents a steam power plant, 2 an ore reduction kiln, 3 a rotary sponge conveyor connected with the lower end of said kiln and to which sponge is delivered from said kiln in which the sponge so delivered is purified, 4 a fusion furnace into which are delivered the purified sponge from conveyor 3, 5 a lime kiln from which lime is delivered to fusion furnace 4, and 6 a vertical clinkering chamber, circular in cross-section, into which is delivered the slag from fusion furnace 5 and also lime from lime kiln 4.

Ore reduction kiln 2 is supplied with iron ore from any suitable source of supply through an inlet tube 7, through which the ore is fed into the kiln continuously during the operation of the plant.

Ore-reducing gases are supplied to kiln 2 from a gas generator 8 through a tube 9 leading therefrom to the lower end of kiln 2. For the production of this reducing gas generator 8 is supplied, through a tube 10, with carbon in dust form from a carbon dust feeding device 11 which is supplied with carbon by an elevator 12 leading from a source of supply thereof. Tube 10 is provided with a valve $10^a$ for regulating the supply of carbon dust to generator 8.

The temperature maintained in generator 8, it will be understood, is such as to produce CO gas from $CO_2$ and carbon dust, and this gas, as before stated, passes from the generator into the delivery end of the reduction kiln 2 at about 1600° to 1800° F. and thence, through the ore therein, to the ore-receiving end thereof, whence it is discharged through a tube 13. This tube 13 is provided with a blower 14 the discharge end whereof connects with tube 10 near generator 8, this blower aiding in withdrawing the used reducing gases from kiln 2, in circulating the reducing gases through the ore therein, and in delivering the used gases ($CO_2$) withdrawn from the kiln 2 to the generator 8, and it also, by its connection with tube 10, aids in the feeding of the carbon dust from the feeding device 11 to generator 8. The $CO_2$ gases thus delivered by blower 14 to generator 8 mix with carbon dust in tube 10 and are reconverted into CO gas in generator 8 by a suitable heating agent. Generator 8 is also provided with an outlet 15 for coal ash, with a tube 16 controlled by a valve 16$^a$ and connected with fusion furnace 4 so as to supply it with a portion of the gases made in the generator, and with a tube 17 connected with power plant 1, through which waste gases of the heating agent are delivered from the generator 8 to the power plant whence they pass to the atmosphere or elsewhere through a tube 18. The purpose in passing the waste gases through the power plant is to utilize the heat thereof in generating the steam therein and maintaining the exhaust steam at a high temperature, such exhaust steam passing by a tube 19 to a preheater 20 and being used to generate water gas, as hereinafter more fully described. Water is fed to steam plant 1 through a pipe 21.

The delivery end of sponge conveyor 3 is connected with the lower part of fusion furnace 4 by means of a funnel 22 and a tube 23 provided with a plunger 24 connected eccentrically, by a rod 25, with the fly-wheel 26 of a motor, this plunger in its forward stroke pushing the purified sponge from funnel 22 into the fusion furnace and being of such length that no sponge can fall behind it from said funnel. Sponge conveyor 3 is provided with an inlet pipe 27 through which carbon and other materials may be introduced into the sponge before it is delivered into the fusion furnace, according to the quality of steel desired.

Conveyor 3 is supplied with sponge-purifying water gas from a generator 28 through a tube 29 leading from the generator and connected with the sponge-delivery end of the conveyor; the purifying gas, therefore, passing through the conveyor in the opposite direction to the sponge and thence into the kiln 2 where it assists in the reduction of the ore in the latter.

Generator 28 is supplied with the necessary materials, carbon dust and steam, for the generation of the desired water gas, by a tube 30 controlled by a valve 30$^a$ and leading from the carbon dust feeder 11, and tube 31, connected with tube 30 near generator 28, and leading from the preheater 20, to which latter steam is delivered by tube 19 from the power plant 1, as before stated, and in which the steam is further heated preliminary to its feed to the generator 28. Generator 28 is provided with an outlet tube 32 for coal ash and with an outlet tube 33 for waste gases, which are conducted thereby into preheater 20 and there utilized in the heating of the steam in the preheater, such waste gases passing from the preheater by a tube 34 to the atmosphere or elsewhere.

Fusion furnace 4 is supplied, from generator 8 by the tube 16, with fuel gas and air is supplied from the upper part of the fusion furnace by a tube 35, connecting such upper part of the furnace with tube 16. Fusion furnace 4 is of the double shell type, with its upper and lower parts separated. Its upper part is air-cooled by a fan 36 connected with it by a tube 37 through which cold air is introduced into it and passes into the fusion furnace by pipe 35 in a heated state. There the sponge and lime are fused at ordinary blast furnace temperatures, or in other words, at temperature substantially less than clinkering temperature. The fuel gas from tube 16 and air from tube 35 enters the furnace, as in usual gas furnace practice.

Fusion furnace 4 is provided with a tap 38 through which the molten iron therein is withdrawn and with a tube 39 through which the slag therein is conducted into the clinkering chamber 6, for the formation of cement slag, as more fully explained later on. Between the ends of tube 39 there is provided a spherical-shaped chamber 40 in which the slag is heated to a clinkering temperature before entering chamber 6, by the flame from gas jets 41 connected with a manifold 42 which is in turn connected by a tube 43 with a suitable supply of gas. Tube 39 is also provided between fusion furnace 4 and chamber 40 with an inlet-tube 44 which may be used for the addition to the slag of cement elements or ingredients, if desired.

Lime kiln 5 is supplied with lime, preferably as limestone, by a tube 46 leading from any suitable source of supply. The kiln is connected at its delivery end with fusion furnace 4 so as to deliver lime to it. It is heated by the waste gases from the fusion furnace which enter it at its delivery end and pass through it and the limestone in it and finally escape to the atmosphere or elsewhere through a pipe 47. The lime delivered from kiln 2 is preferably in the form of dust.

Only a portion of the lime is thus delivered to the fusion furnace, the quantity so delivered being that which is necessary to form slag at blast furnace temperatures or substantially less than clinkering temperatures.

Clinkering chamber 6 is, as before stated, vertical and preferably circular in cross-section, and has, above the slag delivery end of tube 39, a dome-shaped upper end 48, which is closed to the atmosphere. At its lower end it opens into a tank 49 which receives the cement slag formed in it by the combination of the slag from fusion furnace 4 and lime kiln 5. Tube 39, it will be noted, enters chamber 6 so as to discharge the slag at about the center thereof or out of contact with its walls. Beneath the delivery end of tube 39 a deflector 39$^a$ is provided which intercepts the descending slag and causes it to descend in chamber 6 in a shower, as indicated by dotted lines.

Lime from kiln 5 is fed to chamber 6 or near its bottom by pipe 50 and a series of branch pipes 50$^a$. The latter project into the chamber 6 so as to deliver the lime, which is preferably in the form of dust, in the center of the chamber, so as to meet and intimately combine with the descending slag. Another result of this arrangement for the delivery of the slag and lime at about the center of the chamber 6 is that the combination of the two is effected out of contact with the wall of the chamber so that the walls thereof are not injuriously affected by their heat.

The receiving end of pipe 50 is in the delivery end of kiln 5, in line with another injector pipe 51, projecting from a tube 52 which is in turn connected with a blower 53 which forces air through it and through pipes 51, 50, 50$^a$; this air carrying with it lime dust from kiln 5. The air thus forced through tube 52 and pipes 51, 50, 50$^a$ is heated by the waste gases from clinkering chamber 6 which escape therefrom by a passage 6$^a$ and thence pass through a tube 54 and tube 17 to the power plant 1. Tubes 50$^a$ are provided with valves 50$^b$ by which the feed of lime to chamber 6 may be regulated. They are also provided with tubes 50$^c$ through which cement making materials may be added to the lime and slag entering chamber 6.

Clinkering chamber 6 is also provided at its lower end with a series of gas jets 55 from manifold 42 through which gas is supplied to the chamber, the air used for combustion being the air carrying the lime dust in suspension. The gas for these jets merges with the discharge ends of air and lime-supplying tubes 50$^a$ so that the lime as it enters the chamber is raised to a clinkering temperature for meeting and combining with the slag descending in said chamber from tube 39 which is also at a clinkering temperature. Although it is preferred to raise the slag and also the lime to clinkering temperature before their combination, the result aimed at is doing so by having the temperature of one above and the temperature of the other below clinkering temperature, provided the average of the two is a clinkering temperature. The temperature of the combining slag and lime is still further increased by the heat of formation on the meeting and combination of the two.

The lime and slag thus combined and having the composition of cement slag descends into vat 49 whence it is withdrawn and shotted, as for example, through a slag trap 56 and a shotting device 57 which may be connected with a suitable device for propelling a blast of air through it and the moving slag within it.

The temperature employed in kiln 2 and conveyor 3 are those ordinarily employed for ore-reduction and sponge purification, respectively, and that employed in lime kiln 5 is that which is necessary for the reduction of limestone to lime.

Waste gases escaping from clinkering chamber 6 through passage 6$^a$ might take with them some of the lime in chamber 6, which would be objectionable. To avoid this I have devised a modified form of clinkering chamber in which the passage 6$^a$ and the closed upper end 48 of the clinkering chamber 6 are omitted. This clinkering chamber has a long chimney 58, open at its top, and also of enlarged area in cross section intermediate its length, as shown at 59. The effect of such enlargement is to decrease the velocity of the escaping gases to such an extent that the lime will not pass with them into the atmosphere but will again descend to the bottom of the chamber.

In view of the foregoing detailed description a résumé of the process will suffice for an understanding of it.

The ore is reduced in kiln 2 and the resulting sponge purified in conveyor 3 at the usual temperature; the purified sponge delivered from conveyor 3 to fusion furnace 4 and the lime delivered from kiln 5 to furnace 4 are fused in said furnace at ordinary blast furnace temperatures, this being possible because the quantity of lime so delivered is less than that required for clinker and about that for ordinary commercial slag; the resulting iron or steel in fusion furnace 4 is drawn off through tap 38 and the liquid slag is also drawn off through tube 39 and in passing through chamber 40 in said tube, on its way to clinkering chamber 6, it is raised to a clinkering temperature and at that temperature enters chamber 6; and an additional quantity of lime (preferably in the form of dust) from kiln 5 and also at a clinkering temperature enters the lower end of chamber 6 and there combines with the slag descending therein. The result is a liquid cement clinker, or cementitious slag, which is deposited in vat 49, from which it is withdrawn and conducted to the shotting device 57.

What I claim is:—

1. The process of making cement clinker, with an iron or steeel by-product, which consists in adding lime to iron sponge in less quantity than that required for clinker, fusing the sponge and lime to a liquid state in a fusion furnace at a temperature substantially lower than that for clinkering, withdrawing the resulting liquid slag from the furnace, raising its temperature to that required for clinkering, and adding thereto, in a suitable chamber and at a clinkering temperature, the lime necessary for cement clinker.

2. The process of making cement clinker, with an iron or steel by-product, which consists in adding lime to iron sponge in less quantity than that required for clinker, fusing the sponge and lime to a liquid state in a fusion furnace at a temperature substantially lower than that for clinkering, withdrawing the resulting liquid slag from the furnace, raising its temperature to that required for clinkering, and adding thereto, in a suitable chamber and at a clinkering temperature, the lime necessary for cement clinker, the slag and lime being simultaneously introduced into the upper and lower portions, respectively, of said chamber, whereby the lime will meet and intimately combine with the descending slag.

3. The process of making cement clinker, with an iron or steel by-product, which consists in adding lime to iron sponge in less quantity than that required for clinker, fusing the sponge and lime to a liquid state in a fusion furnace at a temperature substantially lower than that for clinkering, withdrawing the resulting liquid slag from the furnace, raising its temperature to that required for clinkering, and adding thereto, in a suitable chamber and at a clinkering temperature, the lime necessary for cement clinker, the slag and lime being simultaneously introduced into the upper and lower portions, respectively, of said chamber, and at about the center thereof, whereby the lime will meet and intimately combine with the descending slag and the combination of the two be effected away from the walls of the chamber.

4. The process of making cement clinker, with an iron or steel by-product, which consists in adding lime to iron sponge in less quantity than that required for clinker, fusing the sponge and lime to a liquid state in a fusion furnace at a temperature substantially lower than that for clinkering, withdrawing the resulting liquid slag from the furnace, and adding thereto, in a suitable chamber, the lime necessary for cement clinker, the average temperature of the slag and lime at the time of such addition being that necessary for clinkering.

5. The process of making cement clinker, with an iron or steel by-product, which consists in adding lime to iron sponge in less quantity than that required for clinker, fusing the sponge and lime to a liquid state in a fusion furnace at a temperature substantially lower than that for clinkering, withdrawing the resulting liquid slag from the furnace, and adding thereto, in a suitable chamber, the lime necessary for cement clinker, the average temperature of the slag and lime at the time of such addition being that necessary for clinkering, the slag and lime being simultaneously introduced into the upper and lower portions, respectively, of said chamber whereby the lime will meet and intimately combine with the descending slag.

6. The process of making cement clinker, with an iron or steel by-product, which consists in adding lime to iron sponge in less quantity than that required for clinker, fusing the sponge and lime to a liquid state in a fusion furnace at a temperature substantially lower than that for clinkering, withdrawing the resulting liquid slag from the furnace, and adding thereto, in a suitable chamber, the lime necessary for cement clinker, the average temperature of the slag and lime at the time of such addition being that necessary for clinkering, the slag and lime being simultaneously introduced into the upper and lower portions, respectively, of said chamber, and at about the center thereof, whereby the lime will meet and intimately combine with the descending slag and the combination of the two be effected away from the walls of the chamber.

7. The process of making cement clinker which consists in raising to a clinkering temperature liquid slag whose lime content is less than that required for clinker, and adding thereto in a suitable chamber the lime necessary for cement clinker, the lime so added being heated in a flame to clinkering temperature by intimately mixing the lime with the air prior to its being used for combustion in the flame.

8. The process of making cement clinker which consists in raising to a clinkering temperature liquid slag whose lime content is less than that required for clinker, and adding thereto in a suitable chamber and at a clinkering temperature, the lime necessary for cement clinker, the slag and lime being simultaneously introduced into the upper and lower portions, respectively, of said chamber, whereby the lime will meet and intimately combine with the descending slag.

9. The process of making cement clinker which consists in raising to a clinkering temperature liquid slag whose lime content is less than that required for clinker, and adding thereto in a suitable chamber and at a clinkering temperature, the lime necessary for cement clinker, the slag and lime being simultaneously introduced into the upper and lower portions, respectively, of said chamber, and at about the center thereof, whereby the lime will meet and intimately combine with the descending slag and the combination of the two be effected away from the walls of the chamber.

10. The process of making cement clinker which consists in adding, in a suitable chamber, to liquid slag whose lime content is less than that required for clinkering, the lime necessary for cement clinker, the average temperature of the slag and lime at the time of such addition being that necessary for clinkering, the slag and lime being simultaneously introduced into the upper and lower portions, respectively, of said chamber, whereby the lime will meet and intimately combine with the descending slag.

11. The process of making cement clinker which consists in adding, in a suitable chamber, to liquid slag whose lime content is less than that required for clinkering, the lime necessary for cement clinker, the average temperature of the slag and lime at the time of such addition being that necessary for clinkering, the slag and lime being simultaneously introduced into the upper and lower portions, respectively, of said chamber, and at about the center thereof, whereby the lime will meet and intimately combine with the descending slag and the combination of the two be effected away from the walls of the chamber.

In testimony whereof, I have hereunto set my hand.

CHARLES B. HILLHOUSE.